US008566559B2

(12) United States Patent
Schmich et al.

(10) Patent No.: US 8,566,559 B2
(45) Date of Patent: Oct. 22, 2013

(54) RUNTIME TYPE IDENTIFICATION OF NATIVE HEAP ALLOCATIONS

(75) Inventors: Christopher Schmich, Bellevue, WA (US); Aaron R. Robinson, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 182 days.

(21) Appl. No.: 13/269,626

(22) Filed: Oct. 10, 2011

(65) Prior Publication Data

US 2013/0091337 A1    Apr. 11, 2013

(51) Int. Cl.
*G06F 12/10* (2006.01)
(52) U.S. Cl.
USPC ............ 711/171; 711/203; 717/124; 707/813
(58) Field of Classification Search
USPC ............ 711/161, 171, 203; 717/124; 707/813
See application file for complete search history.

(56) References Cited

U.S. PATENT DOCUMENTS

| 6,658,653 | B1 | 12/2003 | Bates et al. |
| 6,817,011 | B1 | 11/2004 | Reynolds |
| 7,434,020 | B2 | 10/2008 | Swafford et al. |
| 2009/0328007 | A1 | 12/2009 | Chen et al. |
| 2010/0211754 | A1 | 8/2010 | Crosby et al. |
| 2010/0287538 | A1 | 11/2010 | Soundararajan et al. |
| 2011/0145536 | A1 | 6/2011 | Zachmann |
| 2011/0154300 | A1 | 6/2011 | Rao et al. |

OTHER PUBLICATIONS

Kovacs, James., "Identify and Prevent Memory Leaks in Managed Code", Retrieved at <<http://msdn.microsoft.com/en-us/magazine/cc163491.aspx>>, Retrieved Date: Jul. 15, 2011, pp. 7.
"Heap Analysis: Making Memory Errors a Thing of the Past", Retrieved at <<http://www.qnx.com/developers/docs/6.5.0/index.jsp?topic=/com.qnx.doc.neutrino_prog/hat.html>>, Retrieved Date: Jul. 15, 2011, pp. 19.
Aditya, et al., "Garbage Collection for Strongly-Typed Languages using Run-time Type Reconstruction", Retrieved at <<http://citeseerx.ist.psu.edu/viewdoc/download?doi=10.1.1.18.5356&rep=rep1&type=pdf>>, Proceedings of the ACM conference on LISP and functional programming, Jun. 27-29, 1994, pp. 13.
Polishchuk, et al., "Dynamic Heap Type Inference for Program Understanding and Debugging", Retrieved at <<http://citeseerx.ist.psu.edu/viewdoc/download?doi=10.1.1.72.2307&rep=rep1&type=pdf>>, Proceedings of the 34th annual ACM SIGPLAN-SIGACT symposium on Principles of programming languages, Jan. 17-19, 2007, pp. 1-8.
"International Search Report", Mailed Date: Feb. 28, 2013, Application No. PCT/US2012/059267, Filed Date: Oct. 9, 2012, pp. 10.

*Primary Examiner* — John Lane (57) ABSTRACT

During compilation, a table mapping relative virtual address of a memory-allocating instruction of a native language program to a user type of the instance is created. During execution of the program, a module injected into the process intercepts calls to memory allocating functions and records the virtual address of the instruction calling the memory allocating function and the virtual address of the instance created. When a snapshot of the process heap is requested, the user type of the corresponding compile time instruction is assigned to the created instance. User type and heap information can be used to compute sizes of memory allocations and to aggregate user type instance counts and sizes. Using the static debugging information, a reference graph that displays the nesting of objects in live instances can be computed and displayed.

20 Claims, 7 Drawing Sheets

| Native Memory Snapshot /235 | | | |
|---|---|---|---|
| Type —232 | 234— Instances | Total Size | Definition —233 |
| PACKETNODE | 3137 | 102.82 MB | strtbl.h(145) |
| ... | | | |
| SYM*[] —236 | 238—3 | 8.69 MB | proc.h(16) 246 |
| ... | | | |

240

| # | Instance Size | Module | Allocation Size | Source |
|---|---|---|---|---|
| 47,573 | 4.34 MB | vsinstr.exe | SYMITERPRIVATE::SYM... | sys.cpp(2753) |
| 20,527 | 4.34 MB | vsinstr.exe | SYMITERPRIVATE::SYM... | sys.cpp(2753) |
| 250 251 | 252 | 253 | 254 |

242

SYM*[] – sym.cpp(2753)
Referenced by —255
  SYMITERPRIVATE-sym.cpp(2314)
  SYMTBL – img.cpp(44)
  ...
256 257
Refers to

RUNTIME TYPE IDENTIFICATION OF NATIVE HEAP ALLOCATIONS

BACKGROUND

Memory management involves the allocation of portions of memory to programs upon request, and freeing allocated memory for reuse when the program no longer needs the memory. Inefficient or incorrect usage of memory can degrade program performance or can cause programs to crash. Similarly, failing to free allocated memory or improperly freeing memory can degrade program performance or can cause programs to crash.

The term "garbage collection" is often used to refer to a form of automatic memory management in which a garbage collector reclaims memory that is no longer in use. Garbage collection is a technique that is frequently used in virtual machine environments. In contrast, manual memory management relies on the use of instructions in the program to ask the operating system to allocate memory and to de-allocate unused memory. Commonly used languages that manually manage memory include native languages such as C and C++.

Manual memory management can introduce several general classes of errors into a program. For example, a memory leak can occur if allocated portions of memory are not freed when the program is done with them. A memory leak can be relatively harmless (e.g., in a short-running program where the operating system de-allocates program resources when the program ends), or can cause a program to crash if the memory leak exhausts available memory. Even if the memory leak does not exhaust available memory and does not cause the program to crash, program performance can be degraded because, for example, lack of sufficient available memory forces data to be swapped out to disk. Another type of memory management error occurs when allocated space is freed more than once or if a pointer to unallocated memory is freed. This kind of error can corrupt data structures or can improperly free a portion of memory that has since been used by another program construct. If a pointer that points to freed memory is used after the memory is freed, unpredictable results can ensue. Memory overuse occurs when instructions in the program allocate too much memory so that there is not enough memory left for the program to run efficiently.

SUMMARY

A snapshot of an executing native program can be requested and memory allocation statistics on user types allocated at the time of the snapshot request can be provided. Live memory heap allocations can be augmented with user type information using static debugging information and dynamic runtime allocation information. User type and heap information can be used to compute sizes of memory allocations and to aggregate user type instance counts and sizes. Using the static debugging information, a reference graph that displays the nesting of objects in live instances can be computed and displayed. The name of the source file and the line number of the instruction that called the memory allocation function can be provided.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Known tools for programs written in native code can provide information such as "At point A Process B has allocated C bytes of memory starting at Address D". However, known tools are not able to provide user type information associated with the allocated blocks of memory. That is, known tools cannot provide information such as "At point A Process B has allocated C bytes of memory starting at Addresses $D_1, \ldots D_n$ to E instances of Objects of User Type F." In accordance with aspects of the subject matter described herein, a tool that can associate user type information with blocks of memory allocated at particular locations in memory is provided. Information can be aggregated and summarized and provided in a display. The provided information can help a user determine how much memory is being allocated to which user types. This in turn can help a user diagnose memory overuse and other memory allocation patterns in native source code.

A native source program for which user type memory allocations statistics are wanted can be compiled to generate a binary file (e.g., an executable file or a dynamic link library). In accordance with aspects of the subject matter described herein, the relative virtual address (RVA) of an instruction in the binary whose execution results in the allocation of memory can be mapped to or associated with the type of the instance that the instruction at that RVA allocates. When the binary is executed, a program module that intercepts requests for memory allocations can be injected into the target process in which the binary is executing. The injected program module can intercept calls to known memory allocation functions that occur within the target process. As the program runs and allocations occur, the virtual address of the instruction that called the memory allocation function (called herein the callsite) can be recorded. The virtual memory address of the newly created instance can also be recorded and can be mapped to or associated with the virtual address of the instruction that called the memory allocation function.

In response to receiving a request for a heap snapshot, all memory allocations made so far in the process can be identified by walking the heap or heaps associated with the process. The virtual address of each instruction that called a memory allocation function can be converted into an RVA. This RVA can be matched to the corresponding RVA in an RVA/type table previously created (e.g., during compilation) to determine the user type of the instance allocated during execution of the binary. The type of the instance associated with a virtual memory address for an allocated instance can be determined by converting the callsite (the virtual address of the instruction that called the memory allocation function) to the RVA of the instruction in the binary whose execution results in the allocation of memory. To convert the callsite to the RVA, the base address at which the binary was loaded in the process memory can be subtracted from the callsite. The user type associated with the matching RVA from the previous (e.g., compilation) step can be assigned to the callsite. Information for particular user types can be aggregated, summarized and displayed. The displayed information can include type, a total number of instances allocated and the aggregated size of instances of a particular type and the location of the definition of the type. The displayed information can also include a breakdown of each instance of a type, the size of the instance, the module creating the instance, the allocation site of the instance, and the name of the source file and line number of an instruction that allocated the instance.

A reference graph that describes reference relationships can be provided. Reference graph information can be acquired by scanning a process heap for potential pointers by looking for and recording all pointer-sized fields. Non-pointer fields that were recorded can be pruned by using static debug information to determine the type of each potential pointer and deleting non-pointer types. That is, in accordance with some aspects of the subject matter described herein, in response to receiving a request for a snapshot, the process heap can be scanned for instances of potential pointers. Any virtual address having a pointer-sized length can be recorded. It will be appreciated that not all pointer-sized entities are likely to be real pointers. Symbolic debugging information that provides the layout of objects can be used to remove recorded pointer-sized offsets that are not pointers. For example, suppose a program includes an object Foo that includes another object Bar. The layout of the object Foo obtained from the debug file produced at compilation can therefore include a pointer to the object Bar. A reference graph that shows the nesting relationships between the objects Foo and Bar can then be displayed.

Runtime Type Identification of Native Heap Allocations

Figure 1A:
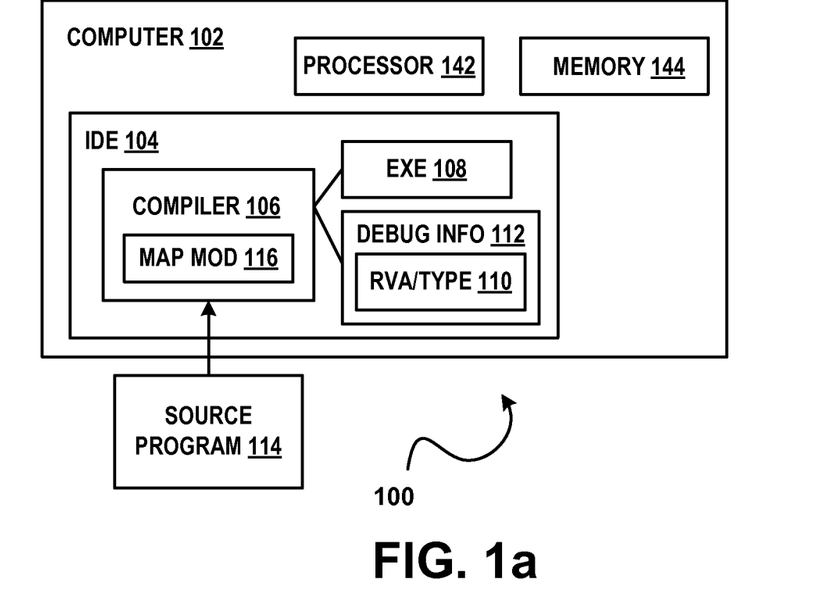
FIG. 1a illustrates an example of a system 100 that captures relative virtual address (RVA) to type information in accordance with aspects of the subject matter disclosed herein.

FIG. 1a illustrates an example of a system 100 that captures RVA to type mapping information in accordance with aspects of the subject matter disclosed herein. All or portions of system 100 may reside on one or more computers such as the computers described below with respect to FIG. 3. System 100 may execute on a software development computer such as the software development computer described with respect to FIG. 4. System 100 or portions thereof may execute within an IDE such as IDE 104 or may execute outside of an IDE. The IDE can be an IDE such as the one described with respect to FIG. 4 or can be any other IDE that supports a native language. All or portions of system 100 may be implemented as a plug-in or add-on.

System 100 may include one or more computers or computing devices such as a computer 102 comprising: one or more processors such as processor 142, etc., a memory such as memory 144, and/or one or more modules such as mapping module 116. System 100 may also include a compiler such as compiler 106. Compiler 106 can be a C or C++ compiler or any other native programming language compiler in which manual memory allocation is implemented. In accordance with aspects of the subject matter disclosed herein, mapping module 116 can be part of compiler 106 or can be a free-standing module (not shown). Mapping module 116 can collect RVA to type information such as RVA/type information 110. Mapping module 116 can collect RVA to type information such as RVA/type information 110 during compilation of a source program 114 into a dynamic link library or executable such as executable 108. Alternatively, mapping module 116 can execute outside of the compilation process.

As compilation progresses, debug information such as debug information 112 can be collected. Debug information can include a list of all the symbols in a program module. The debug information can include the addresses of the symbol, the name of the source file in which the symbol was declared and the line number of the line in the source file in which the symbol was declared. The debug information can be stored in a Program Database file, a proprietary file format developed by Microsoft Corporation® for storing debugging information about a program commonly having a .pdb extension. Alternatively, the debug information can be stored in the binary itself.

The front end of a typical compiler performs syntax and semantic checks and reports errors. The front end can generate an intermediate representation or IR of the source code for processing by the middle end. In the middle end, optimization transformations can occur and a second IR can be generated. The back end typically translates the IR from the middle end into assembly code. During front-end compilation, an abstract syntax tree (AST) is typically created. The AST is a tree representation of the abstract syntactic structure of source code in which each node of the tree represents a construct in the source code. In accordance with aspects of the subject matter disclosed herein, the back-end code generator can use the AST to map relative virtual addresses (RVAs) of memory allocation instructions to the types allocated by those instructions. Hence, the information that maps RVA to type can be calculated by the compiler during compilation and can be included as part of the program's debug database (e.g., in a .PDB file or in the binary itself). This information enables address-based lookup of types when a memory allocation occurs at runtime, as described more fully below.

For example, in the C++ code below a mapping is created from the RVA of the assembly instruction generated by the compiler to the (static) symbol debugging information for the type Foo.

```
struct Foo
{
    int x;
    char b;
};
```

```
Foo* CreateFoo(int x)
{
    Foo* f = new Foo( );
    f->x = x;
    return f;
}
```

Figure 1B:
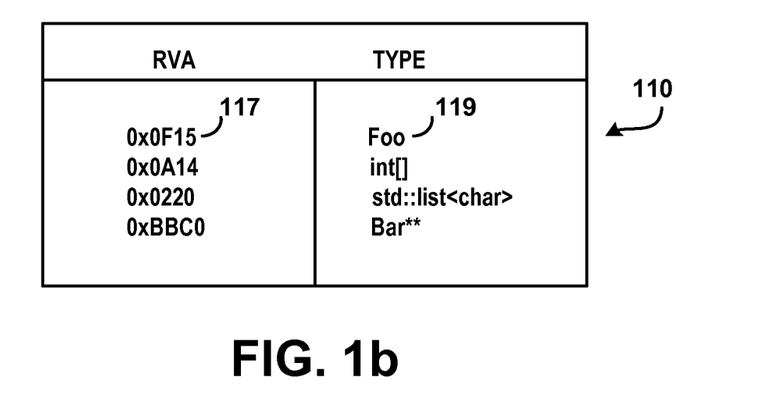
FIG. 1b illustrates an example of a table 110 that maps RVA to type in accordance with aspects of the subject matter disclosed herein.

The mapping information can occur separately from compilation by walking the AST and writing the RVA to type map to a separate file (i.e., not to the debug file). Alternatively, a mapping from source file and line number of the instruction that allocated the memory to the type of the allocated object can be made. During a later analysis phase, runtime memory locations of instructions of the binary can be mapped to line numbers of instructions in source files which can then be correlated with the type information. FIG. 1b illustrates an example of RVA/type information 110, in which, for example, an RVA of 0x0F15 117 is mapped to a type Foo 119, and so on.

Figure 1C:
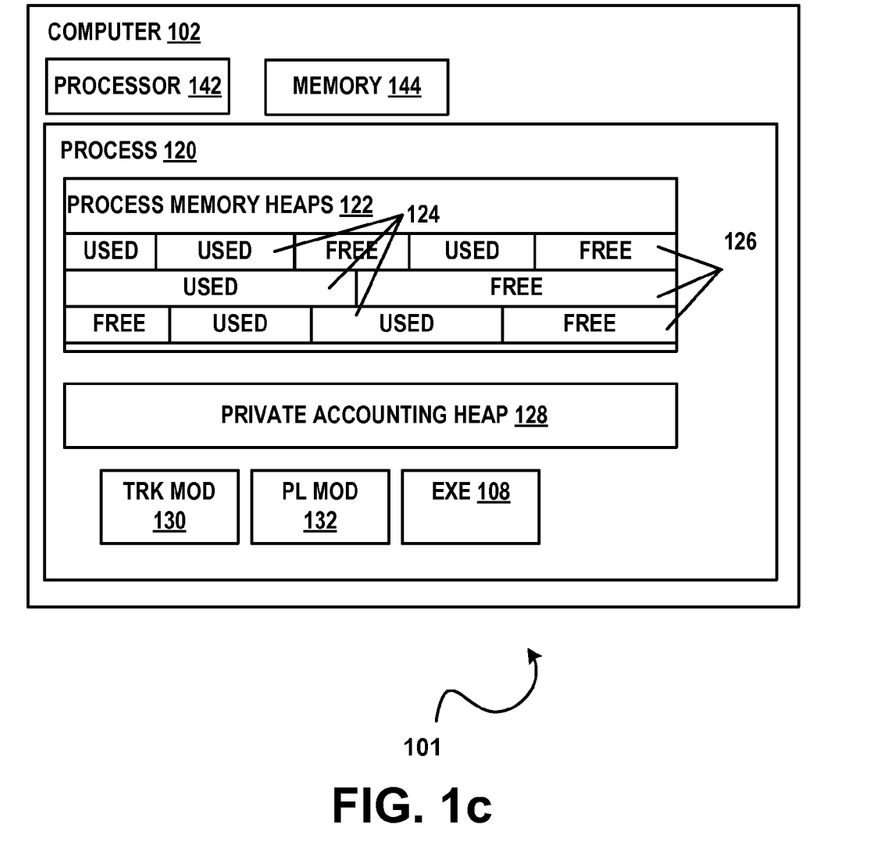
FIG. 1c illustrates an example of a system 101 that captures runtime memory allocation information in accordance with aspects of the subject matter disclosed herein.

Dynamic runtime information comprising information about the location of memory allocations as the allocations are made and information about the memory heaps of the process can also be collected. FIG. 1c illustrates a system 101 that collects dynamic allocation and memory heap information in accordance with aspects of the subject matter disclosed herein. All or portions of system 101 may reside on one or more computers such as the computers described below with respect to FIG. 3. System 100 may execute on a software development computer such as the software development computer described with respect to FIG. 4. System 100 or portions thereof may execute within an IDE or may execute outside of an IDE. The IDE can be an IDE such as the one described with respect to FIG. 4 or can be any other IDE that supports a native language. All or portions of system 100 may be implemented as a plug-in or add-on.

System 101 may include one or more computers or computing devices such as a computer 102 comprising: one or more processors such as processor 142, etc., a memory such as memory 144 and one or more modules such as tracking module 130. System 101 can be the same computer as system 100 or can be a different computer than system 100. A target process can execute the binary of a program for which memory allocation information is desired. For example, target process 120 can execute a program module such as executable 108 for which system 100 collected RVA/type information 110. To intercept and track allocations, a tracking module such as tracking module 130 can be present in the target process. Tracking module 130 can be injected into the target process by adding a static dependency on the tracking module 130 through instrumentation, by creating a remote thread to force the tracking module 130 to load, or by starting the process in a suspended state and modifying the import address table to include the tracking module 130 as its first load-time dependency. Once loaded, tracking module 130 can find known memory allocation methods and can intercept all calls to the known memory allocation methods by rewriting the function or by redirection. Process 120 can also include a runtime for a native programming language such as programming language module or modules 132.

Figure 1D:
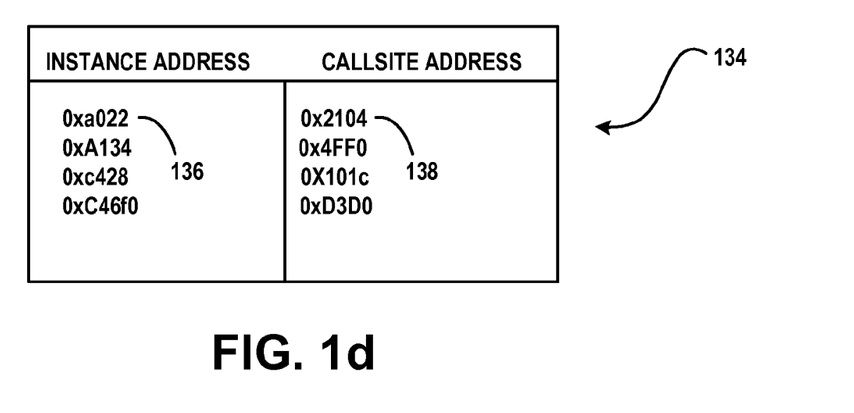
FIG. 1d illustrates an example of a table 134 that maps an address of an instance of an allocation to the virtual address of the instruction that called the memory allocation function in accordance with aspects of the subject matter disclosed herein.

As the user program runs, memory allocations can be requested by the executing program and can be granted by the operating system. Such memory allocations are dynamic and occur in an area of memory referred to as "the heap" or as "the process memory heap" (not to be confused with the heap data structure). Memory is allocated from a pool of unused memory area called the heap or the free store. Because the precise location of the allocation is not known in advance, the memory is accessed indirectly, usually via a pointer reference. Allocations such as instances of objects, etc. can be stored in process memory heaps such as process memory heaps 122. Process memory heaps 122 can include sections of free memory such as free portions 126 and sections of memory that are used such as used portions 124. Allocations can be precipitated by a number of function calls, including but not limited to malloc, operator new, HeapAlloc, GlobalAlloc, CoTaskMemAlloc, and so on. Any allocation functions intercepted by the tracking module 130 can be inspected. Tracking module 130 can forward the call through to the allocation function so the allocation still occurs and can determine the virtual address (VA) of the instruction that called the allocation method by examining the return address for the function. (The VA of the instruction that called the allocation method is referred to herein as the callsite or callsite address.) The address of the newly allocated portion of memory for the instance can be mapped to the calling VA and stored in a table in private accounting heap 128. FIG. 1d illustrates an example of a table that maps an instance address to a callsite address and vice versa. For example in instance address/callsite table 134 a virtual address of an instruction that calls a memory allocation function that allocates an instance at 0xa022 136 is located at 0x2104 138 and so on for all instances allocated by allocation functions that occur. A private heap such as private accounting heap 128 can be used for all memory allocated by the tracking module 130 so that memory allocated by the tracking module is not included in the allocation statistics for the program under consideration (e.g., source program 114 for which executable 108 was generated).

While the program is executing, a heap snapshot can be requested in response to a user gesture or can be automatically initiated in response to detection of a diagnostic event, (e.g., when a debug breakpoint is encountered). When a snapshot of a heap is taken, live instances of portions of memory (i.e., portions of memory that are allocated and not yet freed) are identified along with the types associated with the allocated memory portions and references to that portion of memory. To identify live instances, in accordance with some aspects of the subject matter disclosed herein, application program interfaces (APIs) that access process heaps and that walk process heaps can be used to determine the portions of memory that are currently allocated on the process' heaps. Then, the instance-address-to-callsite mapping table (e.g., instance address/callsite table 134 of FIG. 1d) can be used to map a live instance to the virtual address of the instruction that called the memory allocation function that allocated it. Next, the callsite VA can be converted to an RVA by using module load information that specifies the base load address of the binary. The RVA can be determined by subtracting the base load address of the binary from the VA. Finally, using the static debugging information created at compile-time and the callsite RVA, the allocated instance can be mapped to its underlying type.

Figure 1E:
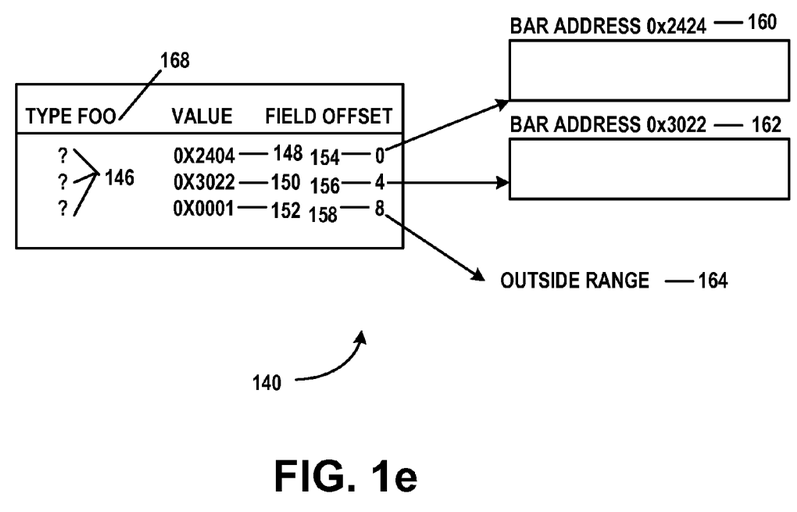
FIG. 1e illustrates an example of a table 140 of potential instance reference information in which some of the potential instance references have been identified as non-pointers in accordance with aspects of the subject matter disclosed herein.

The instance reference graph can also be calculated during heap snapshot processing. When walking the process' heaps, each instance can be examined. Because the instance type is not yet known, all potential references to live memory can be recorded. Any pointer-sized field is a potential reference and can be recorded. FIG. 1e illustrates an example of information collected in a first phase of information collection for the reference graph. FIG. 1e illustrates a table 140 for type Foo 168 that includes a location 0x2404 148 for the field with an offset 0 154 from the beginning of the Foo object, a location 0x3022 150 for the field with an offset 4 156 and a location 0x0001 152 for the field with an offset of 8 158. Each of the fields recorded in table 140 are pointer-sized but because type information for the field is not available at this point, the type of each field is not known, signified by the question mark 146. The location 0x2404 148 is the location of a first instance of a Bar object with start address 0x2424 160. Thus, offset 0 154 is a valid location so the field beginning at offset 0 is a potential pointer. The location 0x3022 150 is also a valid location, the location of a second instance of a Bar object with address 0x3022 162 so the field beginning at offset 4 156 is a potential pointer. The location 0x0001 152 is not a valid location it is outside the range 164 of a Bar object so the field beginning at offset 8 158 is not a reference and can be discarded.

Figure 1F:
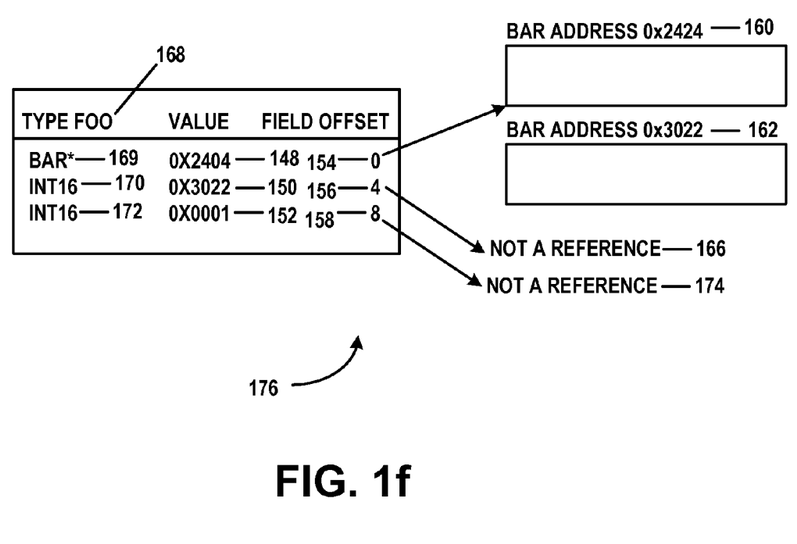
FIG. 1f illustrates an example of a table 176 of potential instance reference information including type information in accordance with aspects of the subject matter disclosed herein.

The type information for each field of type Foo 168 can be determined from the debug information collected during compilation. When the type of the instance is known, symbolic debugging information can be used to determine the layout of the type and the types of the fields it contains. The potential reference graph can be pruned by removing any recorded pointer-sized fields that are not pointer fields in the type. For example, a type may contain an integer field (e.g., int16 170 for the field beginning at offset 4 156, and int16 172 for the field beginning at offset 8 158) that holds a pointer-like value (i.e., the field has the correct length to be a pointer and points to a valid address in memory). After the user type of the instance is determined and the field type (integer) is determined, the potential references that have a non-pointer type can be removed or cut because those potential references are not actually references to other instances. FIG. 1*f* illustrates an example of the previous table 140 augmented with type information for the fields of type Foo 168 and displayed in table 176. The type for the field beginning at offset 0 154 is a pointer that points to an object Bar 169. The type for the field beginning at offset 4 156 is int16 170 and is not a pointer so this field is not a reference 166. The type for the field beginning at offset 8 158 is int16 172 and is not a pointer so this field is not a reference 174. Hence the second and third entries in table 176 can be removed.

Finally, the above information can be summarized and aggregated based on some perspective including but not limited to type, module, source file, namespace, or class name, Statistics including but not limited to instance count, aggregate type size, and reference counts can be calculated and can be displayed for the live instances. The reference graph can be displayed as a tree. Circular references can be abbreviated.

Figure 2A:
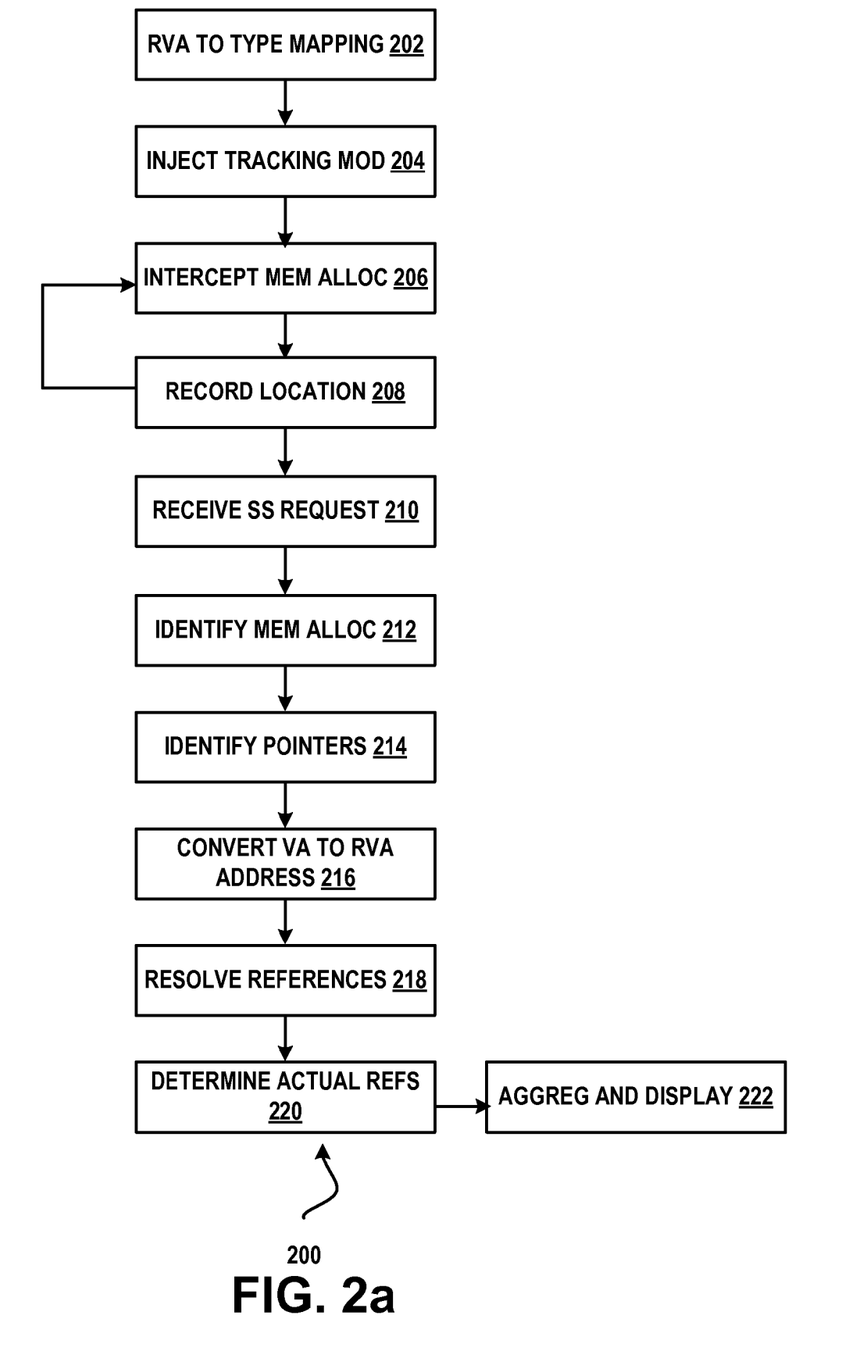
FIG. 2a illustrates an example of a method 200 that computes memory allocation statistics of a target process in accordance with aspects of the subject matter disclosed herein.

FIG. 2*a* illustrates a method 200 that calculates and displays statistics of memory allocations of a target process in accordance with aspects of the subject matter disclosed herein. The method described in FIG. 2 can be practiced by a system such as but not limited to the one described with respect to FIG. 1*a* and/or FIG. 1*c*. While method 200 describes a series of acts that are performed in a sequence, it is to be understood that method 200 is not limited by the order of the sequence. For instance, some acts may occur in a different order that that described. In addition, an act may occur concurrently with another act. In some instances, not all acts may be performed.

In a first phase, at 202 an RVA of an instruction in a binary that requests an allocation of memory can be mapped to a type allocated by the instruction. 202 can be repeated for each instruction that allocates memory in the binary. Mapping from RVA to type can be performed during compilation of the source program. The AST for the source program can be used by the back end code generator of the compiler to map RVA to type and the mapping information can be stored in the debug file. Alternatively, the AST can be walked and the type information can be stored separately. In a second phase, the binary can be executed in a process into which a tracking module has been injected at 204. At 206, as the target process is running, the tracking module can intercept known memory allocating functions that execute within the process. The address of the allocation's callsite can be recorded in the process memory heaps at 208. The memory location at which the instance is stored can also be recorded. The intercepting (206) and recording (208) can continue until a request for a snapshot of the process heap is received at 210. In response to receiving the request for the snapshot, all the memory allocations in the process heap can be identified at 212. At 214 potential instance references can be identified by scanning for and recording pointer-sized offsets within the allocation. At 216 the allocation addresses stored in the process heap can be converted into RVAs. At 218 the RVA-to-type mapping at 202 can be used to resolve allocation types. At 220 symbolic debug information from phase one can be used to remove pointer-like fields of non-pointer types to determine true references as described more fully above. At 222 the aggregated statistics and reference graph can be displayed on a display device.

Figure 2B:
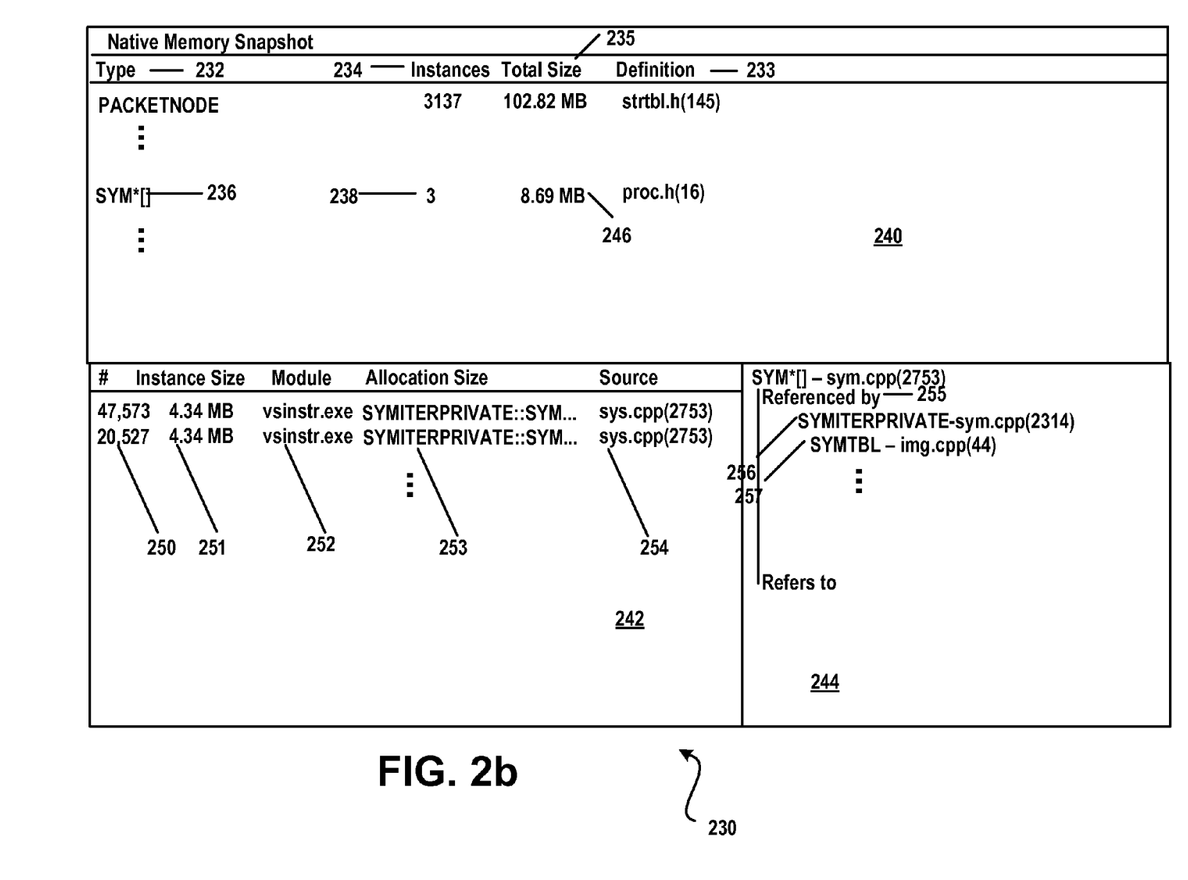
FIG. 2b illustrates an example of a display 230 of computed memory allocation statistics of a target process in accordance with aspects of the subject matter disclosed herein.

FIG. 2*b* illustrates an example of memory allocation display 230 in accordance with aspects of the subject matter disclosed herein. Memory allocation displays can provide memory allocation information from the perspective of type, module, source file, namespace or class name and can include information including but not limited to type, number of instances, total sizes of types, total sizes of modules, total sizes of source files, total sizes of namespaces or total sizes of classes, definition location, source, instance size, module name, allocation size and references and referenced by information. Memory allocation displays can include one or more information panes. An example of one information pane, information pane 1 240 can display memory allocation statistics including but not limited to type 232, instance count 234, aggregate size of all instances of that type 235 and a location where the type is defined 233. Another information pane such as information pane 2 242 can include but is not limited to instance identifier number 250, instance size 251, module 252, allocation size 253, and source 254. Another information pane such as information pane 3 244 can include referenced by information (e.g., sym.cpp 255 is referenced by SYMITERPRTVATE 256, which is referenced by SYMTBL 257 and so on), and can include entities referred to (e.g., nothing 258). FIG. 2*b* information pane 240 provides memory allocation information from the perspective of type 232. For example, in information pane 240, the number of instances 234 of the type SYM 236 is 3 238. The total size of the 3 instances of type SYM 236 is 8.69 MB 246.

Example of a Suitable Computing Environment

Figure 3:
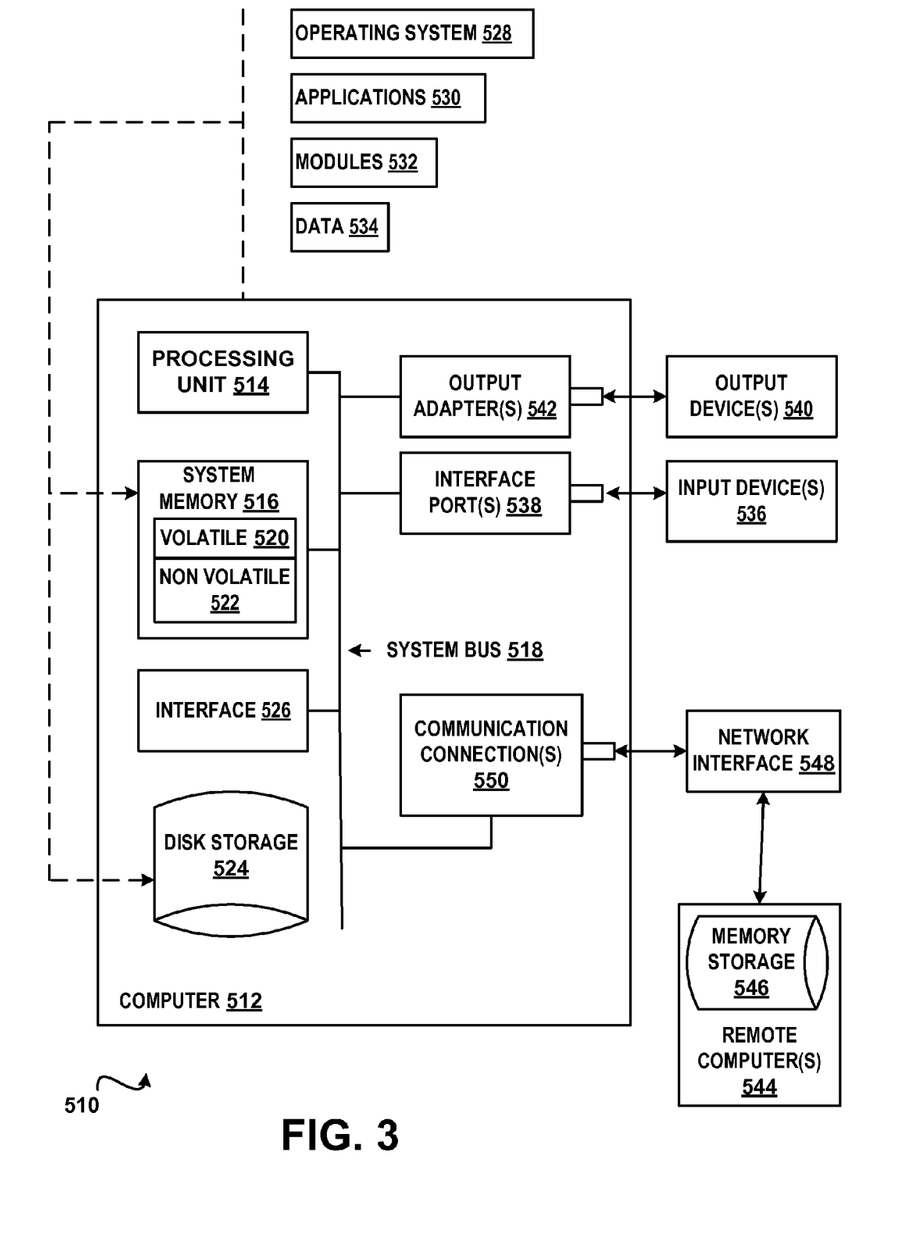
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a GPU. The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device 512 can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computers) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computers's) 544 can be logically connected via communication connection(s) 550. Network interface 548 encompasses communication networks such as local area networks (LANs) and wide area networks (WANs) but may also include other networks. Communication connections) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
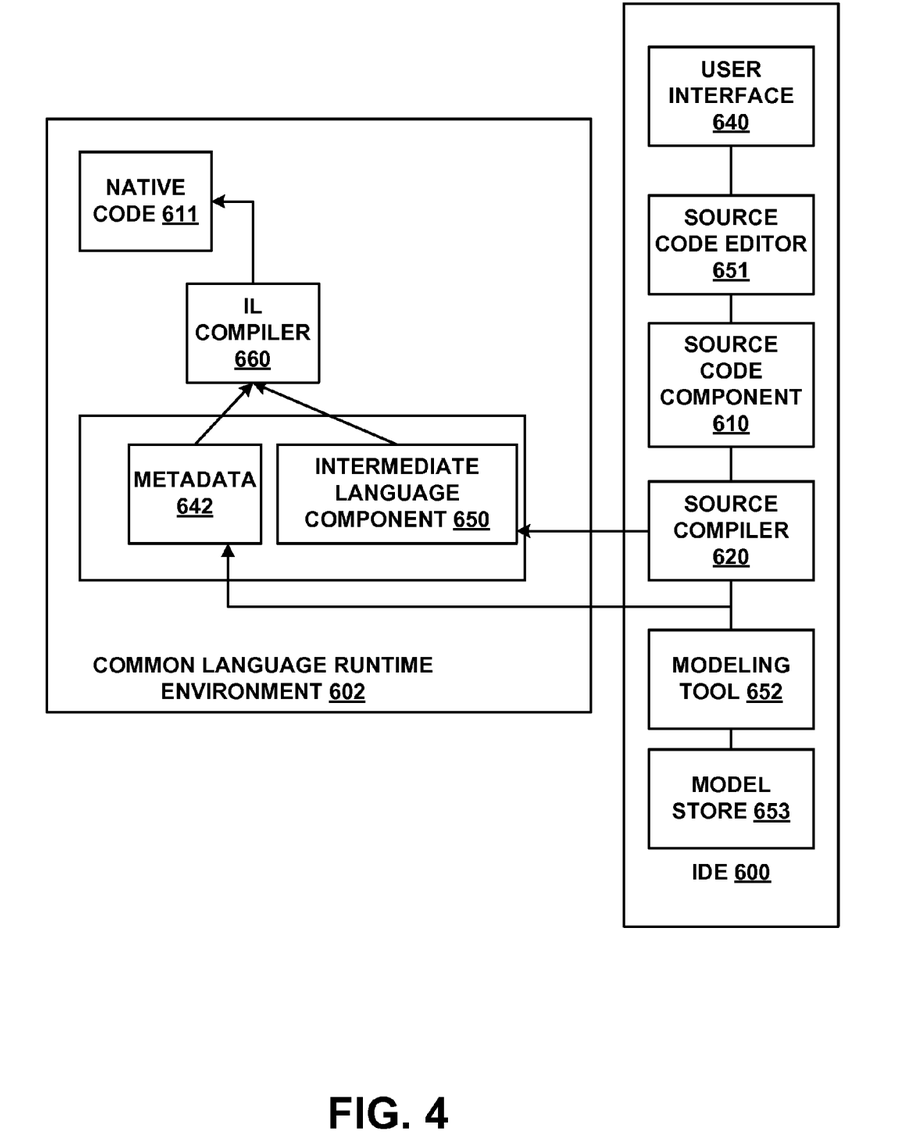
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   at least one processor of a computing device;
   a memory of the computing device; and
   at least one module loaded into the memory causing the at least one processor to:
   in response to receiving a request for a heap snapshot, provide memory allocation statistics of a native language program by:
   receiving information mapping a relative virtual address of an instruction in a binary of the native language program to a user type, the instruction when executed requesting a memory allocation;
   mapping a virtual memory address of the instruction executing in a process to an address of an instance of the memory allocation requested by the instruction;
   matching the virtual memory address of the instruction to a corresponding relative virtual address of the instruction;
   assigning the user type mapped to the corresponding relative virtual address to the virtual memory address of the instruction; and
   aggregating user type instance counts and sizes.

2. The system of claim 1, further comprising:
   at least one module loaded into the memory causing the at least one processor to:
   display a reference graph by:
   scanning a process heap of the process for instances of pointer-sized fields;
   removing non-pointer pointer-sized fields; and
   displaying relationships between memory allocation instances in the reference graph.

3. The system of claim 1, further comprising:
   at least one module loaded into the memory causing the at least one processor to:
   map the relative virtual address of the instruction in the binary of the native language program to the user type during compilation.

4. The system of claim 2, wherein symbolic debugging information generated during compilation provides a layout of the instances, wherein the layout is used to remove recorded pointer-sized fields that are non-pointers.

5. The system of claim 1, further comprising:
   injecting a program module that intercepts requests for memory allocations into the process in which the binary is executing.

6. The system of claim 2, wherein the native language program is a C++ program.

7. The system of claim 2, wherein user type and process heap information are used to compute sizes of memory allocations and to aggregate user type instance counts and sizes.

8. A method comprising:
   mapping a relative virtual address of an instruction in a native language program to a user type, the instruction calling a memory allocation function;
   injecting a tracking module into a target process, the target process executing the instruction on a processor of a computing device;
   intercepting a call to the memory allocation function and recording a return address for the memory allocation function;
   recording an address of an instance allocated in memory by the memory allocation function;
   converting the return address to a corresponding relative virtual address;
   assigning the user type the recorded return address; and
   providing aggregated sizes of memory allocations and user type instance counts and sizes.

9. The method of claim 8, further comprising:
   displaying a reference graph by:
   scanning a process heap for instances of pointer-sized fields;
   removing non-pointer pointer-sized fields; and
   displaying relationships between instances in the reference graph.

10. The method of claim 8, wherein the mapping of the relative virtual address of the instruction to the user type occurs during compilation of the native language program, wherein compilation generates a binary and a static debug file.

11. The method of claim 8, wherein the mapping of the relative virtual address of the instruction to the user type occurs separately from compilation by walking an abstract syntax tree and writing the relative virtual address/user type mapping information to a file separate from a static debug file generated during compilation.

12. The method of claim 9, wherein symbolic debugging information generated during compilation provides a layout of instances, wherein the layout is used to remove recorded pointer-sized fields that are non-pointers.

13. The method of claim 8, wherein the native language program is a C++ program.

14. The method of claim 8, wherein memory allocations and user type instance counts and sizes are provided by type, module, source file, namespace or class name.

15. A machine-readable storage medium comprising computer-executable instructions which when executed cause at least one processor of a computing device to:
  receive static debug information comprising a table mapping relative virtual address of an instruction of a binary of a native program to a user type associated with the instruction, the instruction when executed requesting a memory allocation;
  execute the native program in a process;
  map a virtual memory address of the instruction in the process heap of the process to an address of an instance of the memory allocation;
  match the virtual memory address of the instruction to a corresponding relative virtual address of the instruction;
  assign the user type mapped to the corresponding relative virtual address to the virtual address of the instruction;
  in response to receiving a request for a process heap snapshot, create a reference graph by:
    scanning a process heap for instances of pointer-sized fields;
    removing non-pointer pointer-sized fields; and
    displaying the reference graph.

16. The machine-readable storage medium of claim 15, comprising further computer-executable instructions, which when executed cause at least one processor to:
  aggregate user type instance counts and sizes.

17. The machine-readable storage medium of claim 16, comprising further computer-executable instructions, which when executed cause the at least one processor to:
  receive symbolic debugging information providing a layout of instances, the layout used to remove recorded pointer-sized fields that are non-pointers.

18. The machine-readable storage medium of claim 15, comprising further computer-executable instructions, which when executed cause the at least one processor to:
  execute a C++ program in the process.

19. The machine-readable storage medium of claim 15, comprising further computer-executable instructions, which when executed cause the at least one processor to:
  inject a program module into the process, the program module intercepting calls to functions that allocate memory.

20. The machine-readable storage medium of claim 15, comprising further computer-executable instructions, which when executed cause the at least one processor to:
  provide memory allocations and user type instance counts and sizes by type, module, source file, namespace or class name.

* * * * *